United States Patent [19]

Penny

[11] 3,966,274

[45] June 29, 1976

[54] ROLLER SEPARATOR FOR BIT BEARINGS

[75] Inventor: Samuel Lee Penny, Lancaster, Tex.

[73] Assignee: Dresser Industries, Inc., Dallas, Tex.

[22] Filed: Feb. 13, 1975

[21] Appl. No.: 549,606

[52] U.S. Cl. .............................. 308/8.2; 308/207 R; 308/217
[51] Int. Cl.² ........................................ F16C 19/04
[58] Field of Search .................. 308/8, 2, 207, 184, 308/212, 213, 217

[56] References Cited
UNITED STATES PATENTS

| | | | |
|---|---|---|---|
| 71,973 | 10/1867 | Burnap | 308/217 |
| 3,601,456 | 8/1971 | Becker | 308/8.2 |

Primary Examiner—M. H. Wood, Jr.
Assistant Examiner—Gene A. Church
Attorney, Agent, or Firm—Eddie E. Scott

[57] ABSTRACT

The bearing capacity of a rotary rock bit is increased even though the total number of rollers in the roller bearing system is actually reduced. A multiplicity of individual separator elements and a multiplicity of cylindrical rollers are positioned around the bearing pin of the rotary rock bit, between the bearing pin and the cutter member. The separator elements are alternatively positioned between cylindrical rollers. The separator elements assist in maintaining the longitudinal axis of the cylindrical rollers substantially parallel to the longitudinal axis of the bearing pin and provide a material for the rollers to slide against that is more compatible with the rollers than when the rollers are sliding against each other.

8 Claims, 3 Drawing Figures

ROLLER SEPARATOR FOR BIT BEARINGS

BACKGROUND OF THE INVENTION

The present invention relates to the art of earth boring and more particularly to an improved rotary rock bit. The present invention is especially adapted for use in that type of rotary rock bit popularly known as a three-cone bit; however, its use is not restricted thereto, and the present invention can be used in other types of rotary rock bits.

A three-cone rotary rock bit is adapted to be connected as the lowest member of a rotary drill string. As the drill string is rotated, the bit disintegrates the earth formations to form an earth borehole. The three-cone rotary rock bit includes three individual arms that extend angularly downward from the main body of the bit. The lower end of each arm is shaped to form a spindle or bearing pin. A cone cutter is mounted upon each bearing pin and adapted to rotate thereon. Individual bearing systems promote rotation of the cone cutter. These bearing systems have traditionally been roller bearings, ball bearings, friction bearings, or a combination of the aforementioned bearings. The cone cutters include cutting structure on their outer surfaces that serve to disintegrate the formations as the bit is rotated.

The rotary rock bit must operate under very severe conditions, and the size and geometry of the bit is restricted by the operating characteristics. At the same time, the economics of petroleum production demand a longer lifetime and improved performance from the bit. In attempting to provide an improved bit, new and improved materials have been developed for the cutting structure of the cones, thereby providing a longer useful lifetime for the cones. This has resulted in the bearing systems being generally the first to fail during the drilling operation. Consequently, a need exists for improved bearing systems to extend the useful lifetime of the bit.

In addition to rotational forces experienced by the bit, the bit is subjected to a thrust load during operation. The weight of the drill string and in some instances the downward force applied by the rotary drilling equipment apply a substantial thrust load to the bit. The thrust load in combination with the rotational forces tend to force the rollers into a position askew to the longitudinal axis of the bearing pin. Wear of the roller bearing races tends to exaggerate the skewing problem.

The present invention assists in achieving a more uniform load distribution in the bearing during the drilling operation and lowers contact stress due to reduced misalignment between the rollers and the bearing races. The rollers are guided in such a way as to insure that the axes of the rollers remain substantially parallel to the axis of the bearing pin and aligned with the bearing races to prevent skewing of the rollers during the drilling operation. The present invention also prevents the rollers from sliding against each other. The rollers are spaced symmetrically around the periphery of the bearing pin to help achieve a more uniform load distribution. Heat is dissipated from the bearing surfaces and the lubricant to assist in reducing the operating temperature of the bearing. Separator elements between the rollers provide a more compatible material for the rollers to slide against. The present invention allows the above advantages to be obtained without requiring a substantially greater amount of space than is normally allocated to the roller bearing system. The aforementioned advantages are obtained even though the number of rollers is actually reduced. Space is an extremely important limitation in rotary rock bits, and the ability to increase bearing performance without increasing the space required for the bearing is a substantial improvement.

DESCRIPTION OF PRIOR ART

In U.S. Pat. No. 3,102,601 to D. P. Worth, assigned to Phillips Petroleum Company, patented Sept. 3, 1963, an improved drill bit is shown. Specifically, the improvement relates to providing a drill bit having therein means for releasing drilling fluid at and for predetermined intervals from the face of a tooth on the cutter in order to thereby blow the detritus broken loose from the formation away from the cutter. It is preferred to use a compressed gas such as air for the drilling fluid that is released from the face of the tooth, but grit-free liquids may also be used. The radial loads are carried by the outboard bearings 40 and the inboard bearings 42. The inboard radial bearing comprises the roller bearings 42 spaced apart by the retainer 43. In some installations it may be possible to omit the spacers 41 and 43.

In U.S. Pat. No. 3,235,316 to J. R. Whanger, assigned to Hughes Tool Company, patented Feb. 15, 1966, a journal bearing for a rock bit is shown with alternating surface areas of wear-resistant and anti-galling materials. The bearing system disclosed in this patent includes grooves in one of the rotatable members and a soft metal having anti-galling characteristics positioned in the grooves.

In U.S. Pat. No. 3,720,274 to H. F. McCallum, assigned to Dresser Industries, Inc., patented Mar. 13, 1973, intermediate thrust elements are positioned between the cutters and the bearing pins of an earth boring bit. Each intermediate thrust element is located between a thrust surface on a bearing pin and a thrust surface on the associated cutter. The intermediate thrust elements aid stabilization of the rotating cutter, promote cutter rotation and extend the lifetime of the bit.

In U.S. Pat. No. 3,784,264 to G. C. Jackson, Jr., assigned to Dresser Industries, Inc., patented Jan. 8, 1974, an earth boring bit bearing system is shown. The bearing surface of one relatively rotatable member of a friction bearing is grit blasted to give it a roughened surface. A reservoir containing lubricant having entrained particles of anti-galling material is connected to the friction bearing and serves as a source of anti-galling material. Particles of the anti-galling material are picked up by the roughened surface and a film of anti-galling material formed on the bearing surface.

SUMMARY OF THE INVENTION

The present invention provides an improved bearing system for a rotary rock bit. Conventional theories of individuals skilled in the art dictate that increased bearing capacity must be obtained by increasing the number and/or size of the bearings. Applicant has found that an improved bearing system can actually be obtained with an overall decrease in the number of rollers used in the bearing system of a rotary rock bit. This is critically important in a rotary rock bit where the demand for space is extremely important.

The improved bearing system of the present invention prevents the bearing rollers from becoming disoriented on the bearing pin. The present invention stabilizes the rolling cutters, increases bearing life, and reduces heat generation. The present invention provides separator elements between bearing rollers and provides a material that may be more compatible with the metals used for the rollers. The bit of the present invention includes a bit body, at least one bearing pin extending said bit body, a cutter member rotatably positioned on said bearing pin, a plurality of cylindrical rollers positioned between said bearing pin and said cutter member, and a plurality of individual separator elements positioned between said bearing pin and said cutter member. Each of the individual separator elements are positioned between a pair of adjacent rollers. The bearing system of the present invention does not require a larger amount of the valuable space in the bit than roller bearing systems of the prior art.

The above and other features and advantages of the present invention will become apparent from a consideration of the following detailed description of the invention when taken in conjunction with the drawings.

DETAILED DESCRIPTION OF THE INVENTION

Figure 1:
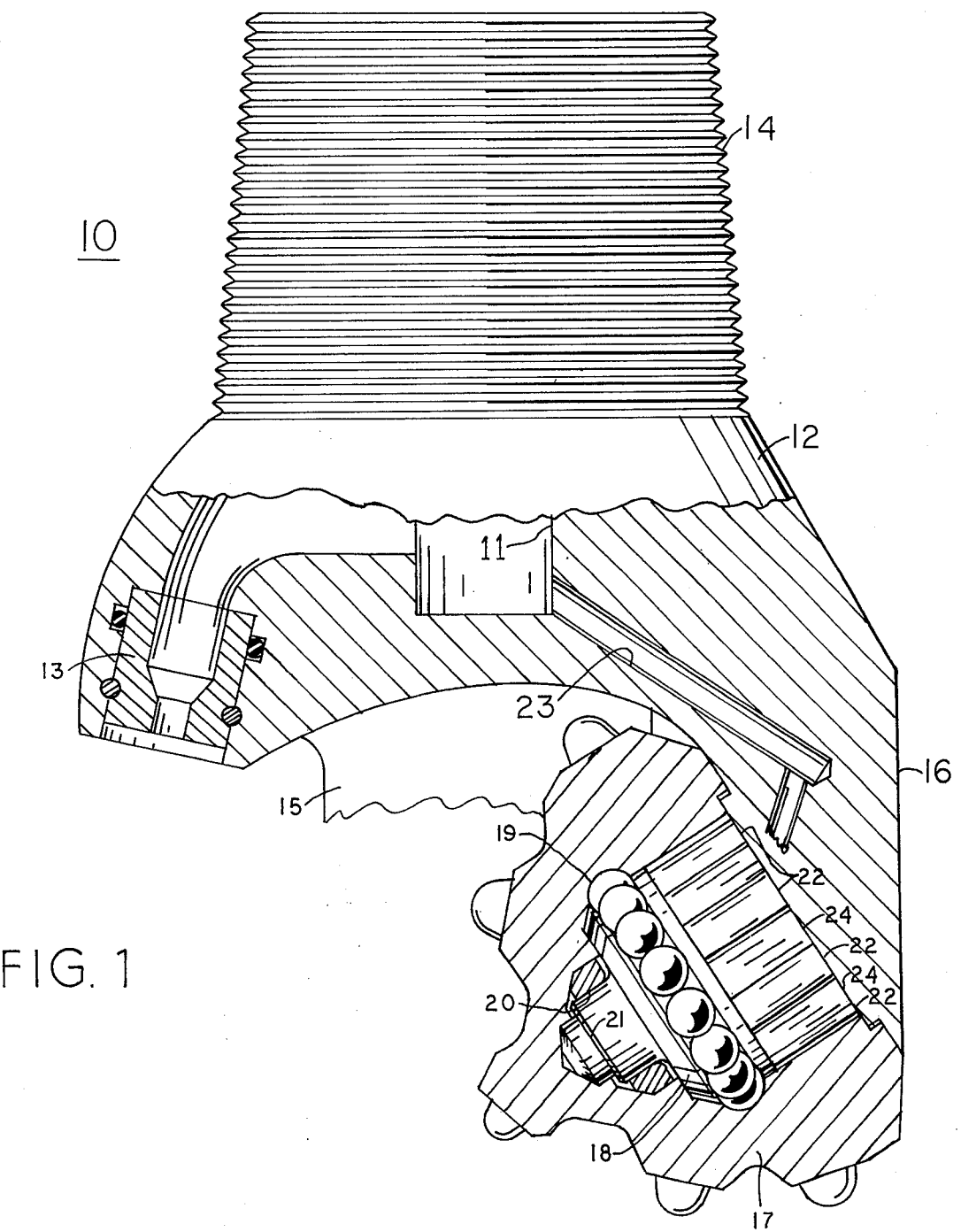
FIG. 1 illustrates an earth boring bit constructed in accordance with the present invention.

Referring now to the drawings and in particular to FIG. 1, an earth boring bit, generally designated by the reference number 10, as illustrated. The bit 10 includes a body portion 12 having an upper portion 14 that is threaded to allow bit 10 to be connected to a rotary drill string (not shown). A multiplicity of arms, arm 16 being shown in section in FIG. 1, extend from body portion 12. The lower portion of each arm forms a bearing pin that projects into a recess formed in the associated rotary cutter. For example, bearing pin 18 extends into a recess in the associated rotary cutter 17. The cutter 17 is journaled on bearing pin 18 by a system of roller bearings 22, a system of ball bearings 19, a journal bearing system 20 and a thrust button 21. A passage system 23 provides conduits from internal chamber 11 to transport cooling fluids to the bearings.

Rotary and thrust loads are applied to the bit 10 during the drilling operation. These loads apply a force to the system of roller bearings 22 that tends to disorient the rollers 22 with respect to the longitudinal axis of bearing pin 18. As the bearing races become increasingly worn, the tendency of the rollers 22 to skew relative to the bearing pin 18 becomes greater.

Figure 2:
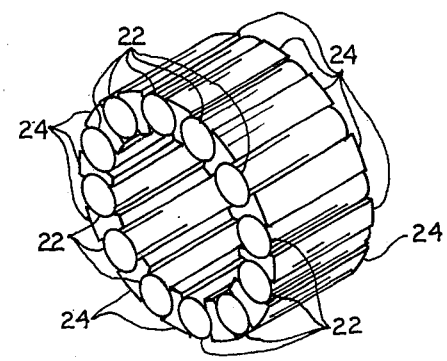
FIG. 2 shows the roller bearing system of the bit illustrated in FIG. 1.

Reffering now to FIG. 2, the system of roller bearings 22 of the bit 10 illustrated in FIG. 1 is shown in greater detail. Separator elements 24 are positioned between each of the rollers 22. The separator elements 24 include concave surface portions that mate with the external surface of the rollers 22. The separator elements 24 are self-aligning and tend to guide the rollers 22 and hold their axes parallel to the axis of the bearing pin 18.

The rollers 22 are hard metal rollers of high wear resistance. In prior art rotary rock bits, the rollers were in contact with each other and in contact with other elements of hard metal having high wear resistance. The sliding contact between the hard metal rollers created an undesirable condition that on occasions would result in the eventual destruction of the rollers and ultimate failure of the bit. Since the surfaces of the adjacent hard metal rollers that are in sliding contact are moving in opposite directions and at a substantial relative speed, the sliding friction developed is substantial.

The separator elements 24 of the present invention provide an element for the rollers to slide against that does not add to the sliding motion. In addition, the separator elements 24 provide a material for the rollers 22 to contact that may be more compatible with the rollers than in prior art bits. For example, the separator elements are of a different metal than the rollers 22. The separator elements 24 do not extend beyond the end of the rollers 22 and the roller bearing system as a unit does not require more space than is normally assigned to the roller bearing system. This is extremely important in a rotary rock bit because of the limited space available for the bearing systems.

Figure 3:
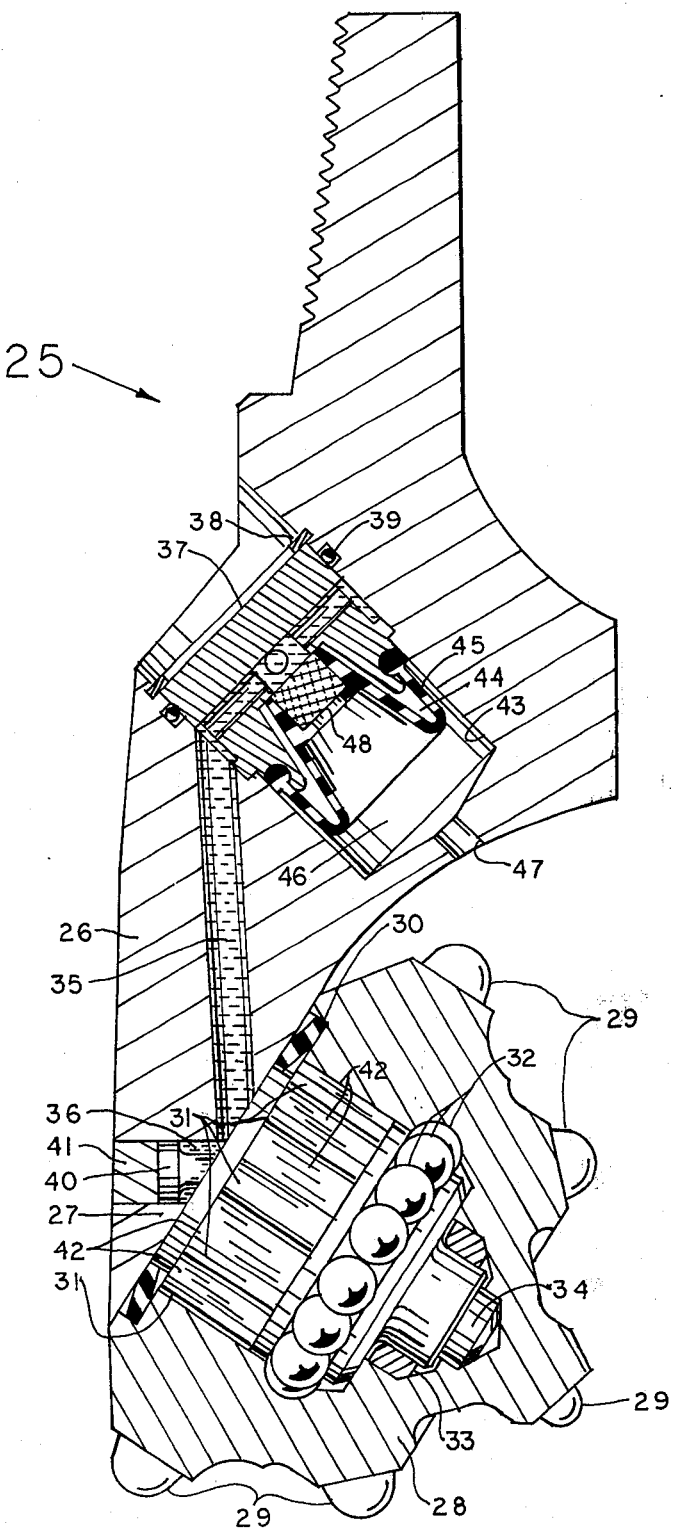
FIG. 3 illustrates another embodiment of the present invention.

The structural details of a rotary rock bit 10 constructed in accordance with the present invention having been described, the operation of the bit 10 will now be considered with reference to FIGS. 1 and 2. The bit 10 is connected as the lowest element of a rotary drill string by engaging the bit 10 with the drill string by threaded connection 14. The bit 10 is rotated and thrust downward, thrusting the cutters against the earth formations. Continued rotation with the weight of the drill string applying a thrust force to the bit 10 causes the cutters to disintegrate the formations and form the desired borehole. The combination of rotary and thrust forces acts to tend to cause the rollers 22 to attempt to become askew to the central axis of the bearing pin 18 and the bearing races. The separator elements 24 serve to prevent the rollers 22 from becoming skewed and provides a material that may be more compatible with the material of the rollers than when the rollers are in direct contact with each other. The rollers 22 and separator elements 24 do not require any more space than is required by prior art roller bearing systems. Referring now to FIG. 3, a sectional view of one arm 26 of a sealed bearing rotary rock bit 25 illustrating another embodiment of the present invention is shown. As illustrated, the arm 26 depends from the upper portion of the bit 25. The bit 25 includes an upper threaded portion that allows the bit to be connected to the lower end of a rotary drill string (not shown). The lower end of arm 26 is provided with an extended journal portion 27. A rotary cone cutter 28 is rotatably positioned upon the extended journal portion or bearing pin 27. The cutter 28 includes cutting structure 29 on its outer surface adapted to disintegrate formations as the bit is rotated and moved downward. The cutting structure 29 is shown in the form of tungsten carbide inserts. However, it is to be understood that other cutting structures such as steel teeth may be used as the cutting structure on the cone cutter 28.

The bit 25 includes a central passageway extending along the central axis of the bit to allow drilling fluid to enter from the upper section of the drill string (not shown) immediately above and passed downward to the bottom of the well bore to flush cuttings and drilling debris from the well bore. A plurality of bearing systems are located in the bearing area between the cutter 28 and the bearing pin 27. The bearing systems in the bearing area include a series of roller bearings 31, a series of ball bearings 32, a friction bearing 33, and a thrust button 34. A seal 30 is positioned between the cutter 28 and the bearing pin 27. The seal 30 retains lubricant in the bearing area around the bearings system and prevents any material in the well bore from entering the bearings.

Separator elements 42 are positioned between each of the rollers 31. The separator elements 42 include concave surface portions that mate with the external surface of the rollers 31. The separator elements 42 are self-aligning and tend to guide the rollers 31 and hold their axes parallel to the axis of the bearing pin 27. The rollers 31 are hardened steel rollers of high wear resistance. In prior art rotary rock bits, the rollers were in contact with each other and in contact with other elements of hardened steel having high wear resistance. The sliding contact between the hardened steel rollers created an undesirable condition that on occasions, would result in the eventual destruction of the rollers and ultimate failure of the bit. Since the surfaces of the adjacent hard metal rollers that are in sliding contact are moving in opposite directions and at a substantial relative speed, the sliding friction developed is substantial.

The separator elements 42 of the present invention provide an element for the rollers 31 to slide against that does not add to the sliding motion. In addition, the separator elements 42 provide a material for the rollers 31 to contact that may be more compatible with the hardened steel rollers than in prior art bits, for example, the separator elements 42 are of a different metal than the hardened steel rolles 31. The separator elements 42 do not extend beyond the end of the rollers 31 and the roller bearing system as a unit does not require more space than is normally assigned to the roller bearing system. This is extremely important in a rotary rock bit because of the limited space available for the bearing systems.

The lubrication system of bit 25 includes a passage 35 that extends through the arm 26 to bearing pin 27 to allow lubricant to be transmitted to the bearings systems. A passage 36 connected to passage 35 allows the make up of the ball bearing system 32 by allowing the balls to be inserted into position after the cone cutter 28 is placed on the bearing pin 27. The series of ball bearings 32 serve to lock the cone cutter 28 on bearing pin 27. After the balls are in place, a plug 42 is inserted into the passage 36 and welded therein by weld 41. Plug 42 has a reduced diameter throughout the major portion of its length to allow lubricant to be transmitted to the bearing area. Additional passages extend from passage 36 to the bearing area to insure a sufficient supply of lubricant to bearings 31, 32, 33 and 34.

A lubricant reservoir is located in the arm 26 to provide a supply of lubricant to the bearings. A flexible diaphragm 45 is positioned in the lubricant reservoir and encloses the reservoir to retain a supply of lubricant in the lubricant area 44. The area 46 within the reservoir chamber but outside of the diaphragm 45 is vented to the dome of the bit 25 by a passageway 47 that connects the lower end of the reservoir chamber with the dome of the bit. The upper end of lubricant reservoir is closed by a cap 37, locked in place in the arm 26 by a snap ring 38. An O-ring seal 39 is positioned around the cap 37 to retain lubricant in the lubricant reservoir. A free-breathing porous filter plug 48 extends through the flexible diaphragm 45. The free-breathing porous filter plug 48 provides fluid communication between lubricant in the lubricant area 44 of the reservoir and fluid from the bore hole that has entered the pressure equalizing portion 46 of the lubricant reservoir. The plug 48 is in the form of compressed metal particles positioned within an open metal cylinder.

The structural details of a rotary rock bit 25 constructed in accordance with the present invention having been described, the operation of the bit 25 will now be considered with reference to FIG. 3. The bit 25 is connected as the lowest element of a rotary drill string by engaging the bit 25 with the drill string by the threaded connection. The bit 25 is rotated and thrust downward, thrusting the cutters against the earth formations. Continued rotation with the weight of the drill string applying a thrust force to the bit 25, causes the cutters to disintegrate the formations and form the desired borehole. The combination of rotary and thrust forces acts to tend to cause the rollers 31 to attempt to become askew to the central axis of the bearing pin 27 and the bearing races. The separator elements 42 serve to prevent the rollers 31 from becoming skewed and provides a material that may be more compatible with the material of the rollers than when the rollers are in direct contact with each other. The rollers 31 and separator elements 42 do not require any more space than is required by prior art roller bearing systems.

The lubrication system of the bit 25 is filled with a suitable lubricant and the area 44 above the flexible diaphragm 45 is completely filled with lubricant. The flexible diaphragm 45 seals the lower end of the lubricant reservoir and is held in place by the lower portion of the cap 37. The bit 25 is lowered into a well bore until the cutter 28 contacts the earth formation at the bottom of the borehole. The hydrostatic pressure of fluid in the well bore is substantial and a pressure differential between the pressure of the lubricant inside of the bit 25 and the pressure of fluid in the borehole will ordinarily develop. The lubrication system of bit 25 allows the pressure of fluid in the well bore to be transmitted to the lubricant in the lubricant reservoir and the pressures are equalized as the bit 25 is moved through the bore hole. Lubricant from the lubricant reservoir passes through passages 35 and 36 and is transmitted to the bearing systems including roller bearings 31 and separator elements 42 to extend the useful lifetime of the bit.

The embodiments of the invention in which an exclusive property or privilege is claimed are defined as follows:

1. A rotary rock bit, comprising:
   a bit body;
   at least one bearing pin extending from said bit body;
   a cutter member rotatably positioned on said bearing pin;
   a plurality of cylindrical rollers positioned between said bearing pin and said cutter member; and
   a plurality of floating independent separator elements positioned between said bearing pin and said cutter member, each individual separator element positioned between a pair of adjacent rollers.

2. The rotary rock bit of claim 1 wherein said separator elements are not connected to each other or to the bearing pin or cutter member.

3. The rotary rock bit of claim 2 wherein said independent separator elements are moveable relative to each other.

4. A rotary rock bit, comprising:

a rock bit body;

at least one bearing pin extending from said rock bit body, said bearing pin having a longitudinal axis;

a cutter member rotatable positioned on said bearing pin;

a plurality of cylindrical rollers positioned around said bearing pin between said bearing pin and said cutter member, said cylindrical rollers having a longitudinal axis with the longitudinal axis of the cylindrical rollers being substantially parallel to the longitudinal axis of said pin; and a plurality of floating independent individual separator elements positioned around said bearing pin between said bearing pin and said cutter member alternately positioned between said cylindrical rollers.

5. The rotary rock bit of claim 4 wherein said separator elements are moveable relative to each other and have a longitudinal axis with said longitudinal axis being substantially parallel to the longitudinal axis of said bearing pin.

6. The rotary rock bit of claim 5 wherein said separator elements are not connected to the bearing pin, the cutter member or to each other.

7. The rotary rock bit of claim 6 wherein said rollers are hard metal rollers of high wear resistance and said separator elements are comprised of a compatible material.

8. In a rotary rock bit having a rock bit body; at least one bearing pin extending from said rock bit body, said bearing pin having a bearing pin raceway; a cutter member rotatably positioned on said bearing pin; said cutter member having a cutter member raceway; and a plurality of cylindrical rollers positioned around said bearing pin between said bearing pin raceway and said cutter member raceway, the improvement comprising:

separator means independent of both said bearing pin raceway and said cutter member raceway positioned around said bearing pin between said bearing pin raceway and said cutter member raceway for preventing the cylindrical rollers from becoming disoriented on said bearing pin and increasing bearing life.

* * * * *

UNITED STATES PATENT OFFICE
CERTIFICATE OF CORRECTION

Patent No. 3,966,274                Dated June 29, 1976

Inventor(s) Samuel Lee Penny

It is certified that error appears in the above-identified patent and that said Letters Patent are hereby corrected as shown below:

Column 7, line 11, after "said" insert -- bearing --.

Signed and Sealed this

Seventh Day of September 1976

[SEAL]

Attest:

RUTH C. MASON
*Attesting Officer*

C. MARSHALL DANN
*Commissioner of Patents and Trademarks*